United States Patent
Chen et al.

(10) Patent No.: US 8,462,291 B2
(45) Date of Patent: Jun. 11, 2013

(54) BACKLIGHT MODULE WITH FILM POSITIONING FUNCTION AND DISPLAY DEVICE USING THE SAME

(75) Inventors: Ching-Feng Chen, Hsin-Chu (TW); Cheng-Min Tsai, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 228 days.

(21) Appl. No.: 12/938,450

(22) Filed: Nov. 3, 2010

(65) Prior Publication Data
US 2011/0149191 A1    Jun. 23, 2011

(30) Foreign Application Priority Data
Dec. 18, 2009 (TW) .............................. 98143499 A

(51) Int. Cl.
*G02F 1/1333* (2006.01)
*G02F 1/1335* (2006.01)

(52) U.S. Cl.
USPC ................................. 349/61; 349/58; 349/62

(58) Field of Classification Search
USPC ....................................................... 349/58–69
See application file for complete search history.

(56) References Cited

U.S. PATENT DOCUMENTS

| | | | |
|---|---|---|---|
| 6,166,788 A * | 12/2000 | Ha et al. ......................... | 349/58 |
| 7,172,331 B2 | 2/2007 | Kuo et al. | |
| 7,819,574 B2 * | 10/2010 | Yoo et al. ....................... | 362/633 |
| 2008/0239199 A1 * | 10/2008 | Wakaki et al. .................. | 349/62 |
| 2009/0147500 A1 * | 6/2009 | An et al. ........................ | 362/97.2 |
| 2009/0168405 A1 | 7/2009 | Yoo | |

FOREIGN PATENT DOCUMENTS

| | | |
|---|---|---|
| CN | 2685921 Y | 3/2005 |
| CN | 101545598 A | 9/2009 |
| CN | 101545601 A | 9/2009 |
| JP | 2007-298736 A | 11/2007 |
| TW | 200708831 | 3/2007 |
| WO | 2007035013 A1 | 3/2007 |

OTHER PUBLICATIONS

China Office Action dated Feb. 17, 2011.
English translation of abstract and pertinent parts of CN 101545601 A.
English translation of abstract and pertinent parts of JP2007-298736A.
English translation of abstract of CN 101545598A.
English translation of abstract of CN 2685921Y.
Taiwan Office Action dated Feb. 27, 2013.
English translation of abstract of TW 200708831 (published Mar. 1, 2007).

* cited by examiner

*Primary Examiner* — Dung Nguyen
(74) *Attorney, Agent, or Firm* — McClure, Qualey & Rodack, LLP

(57) ABSTRACT

A backlight module includes a back plate, an optical sheet, and a lateral frame. The back plate has a first surface, wherein the first surface includes a raised portion formed near the edge of the first surface. An insertion opening is formed between the raised portion and the first surface. The optical sheet is disposed on the first surface, wherein a protrusion is formed at one end of the optical sheet to be inserted into the insertion opening. The lateral frame is disposed on the back plate and corresponds to the edge of the first surface. The lateral frame includes at least a side wall having a sinking portion formed at the bottom of the side wall, wherein the bottom of the side wall is disposed on the optical sheet while the raised portion is received in the sinking portion.

18 Claims, 8 Drawing Sheets

BACKLIGHT MODULE WITH FILM POSITIONING FUNCTION AND DISPLAY DEVICE USING THE SAME

BACKGROUND OF THE INVENTION

1. Field of the Invention

This invention relates to a structure for positioning the reflector of a backlight module; specifically, the present invention relates to a backlight module using frames and other corresponding structures to position the reflector and to a display device including the backlight module.

2. Description of the Prior Art

The backlight module is one of the key components of a TFT-LCD panel (Thin Film Transistor Liquid Crystal Display panel). In the past, cold cathode fluorescent lamps have been adopted as light sources for the TFT-LCD panel. However, issues such as eco-friendliness, aesthetic feeling and the price reduction of light emitting diode (LED) popularizing the use of LEDs as backlight sources for display panel.

Nowadays, backlight modules using LEDs as light sources are now the main stream in the manufacture of nobebook computers. More than 90% of the products produced by manufacturers with advanced LED-related technology are adopting LEDs as light sources for backlight module. Furthermore, as the development of display panel aims at reducing the thickness of the display panels, the LED light sources are now also an important factor of the development of backlight module. The backlight module using LEDs as light sources is thinner than the backlight module with CCFL light sources and improves the overall aesthetics of the display device.

As FIG. 1A and FIG. 1B show, the conventional backlight module 10 includes a frame 12, a plurality of optical films (not illustrated), a light guide plate 14, a reflector 16, a back plate 18 and a light emitting diode module 20. The optical films, the light guide plate 14 and the reflector 16 are orderly disposed on the back plate 18 and then the frame 12 is used to cover the above-mentioned components. As FIG. 1A shows, the light emitting diode module 20 preferably uses a light bar consisting of light emitting diodes as light source. As FIG. 1B shows, the light emitting diode module 20 is disposed below one side of the light guide plate 14 and is adjacent to the reflector 16, wherein the light emitting diode module 20 includes light emitting diodes 21 corresponding to the light entrance end 15 of the light guide plate 14.

During the assembly of the above-mentioned backlight module 10, one side of the light emitting diode module 20 is attached to the back plate 18 using a double-sided tape 24 while the reflector 16 is attached to the other side of the double-sided tape 24 using an adhesive tape 22. In other words, the reflector 16 is attached to only one side the back plate 18 using a double-sided tape 24. However, the reflector 16 is positioned using only a double-sided tape 24 and therefore will wave when subjected to heat during further processes of the backlight module 10.

SUMMARY OF THE INVENTION

It is an object of the present invention to provide a display device and a backlight module thereof, wherein a geometric structure is formed on a back plate of the backlight module to position an optical sheet (reflector).

It is another object of the present invention to provide a display device and a backlight module which prevent the optical sheet from waving caused by heat.

It is yet another object of the present invention to provide a display device and a backlight module thereof which helps to limit the displacement of the optical sheet along a Z-axis direction.

The present invention provides a backlight module including a back plate, an optical sheet, and a lateral frame. The back plate includes a first surface, wherein a raised portion is formed near the edges of the first surface. An insertion opening is formed between the raised portion and the first surface. The optical sheet is disposed on the first surface, wherein a protrusion is formed at one end of the optical sheet and inserted into the insertion opening. The lateral frame is disposed on the back plate corresponding to the edge of the first surface. The lateral frame includes at least one side wall having a sinking portion. The bottom of the side wall is disposed on the optical sheet while the raised portion is received in the sinking portion.

In a preferred embodiment, the raised portion is bent upward from the first surface to form a straight wall, wherein the straight wall is perpendicular to an extending direction of the protrusion. The insertion opening is formed on the straight wall and the protrusion passes through the insertion opening extending close to the edge of the first surface. The insertion opening is formed by bending the raised portion toward the optical sheet. The raised portion has a leg portion and an arm, wherein the leg portion is connected to the first surface and the arm while the arm is perpendicular to the leg portion and parallel to the edge of the first surface.

In another embodiment, the raised portion includes a first raised portion and a second raised portion, wherein each of the first raised portion and the second raised portion has a leg portion and an arm. The leg portion is connected to the first surface and the arm while the arm is parallel to the first surface. The lateral frame further includes a first pressing end formed at one side of the sinking portion for positioning the optical sheet on the first surface. One end of the back plate extends perpendicularly to form a side plate including a hook, wherein the side wall of the lateral frame includes a receiving portion for engaging with the hook.

The present invention further provides a display device including the backlight module as well as a liquid crystal display panel. The liquid crystal display panel is disposed on the backlight module to receive light from the backlight module and generate images on its active area.

DETAILED DESCRIPTION OF THE PREFERRED EMBODIMENT

The present invention provides a display device and a backlight module thereof, wherein the backlight module uses its geometrical structure to position optical sheets. The present invention includes electronic products using the display device such as portable computers. However, in different embodiments, the present invention also includes electronic products such as mobile communication devices, digital camera, and electronic translator/reader. Furthermore, the optical sheet of the present invention is preferably a reflective sheet and the light source is preferably LED light bar used for edge lighting backlight module. However, in different embodiments, the display device of the present invention can also include bottom lighting backlight module using conventional lamps such as cold cathode fluorescent lamps (CCFLs).

Figure 1A:
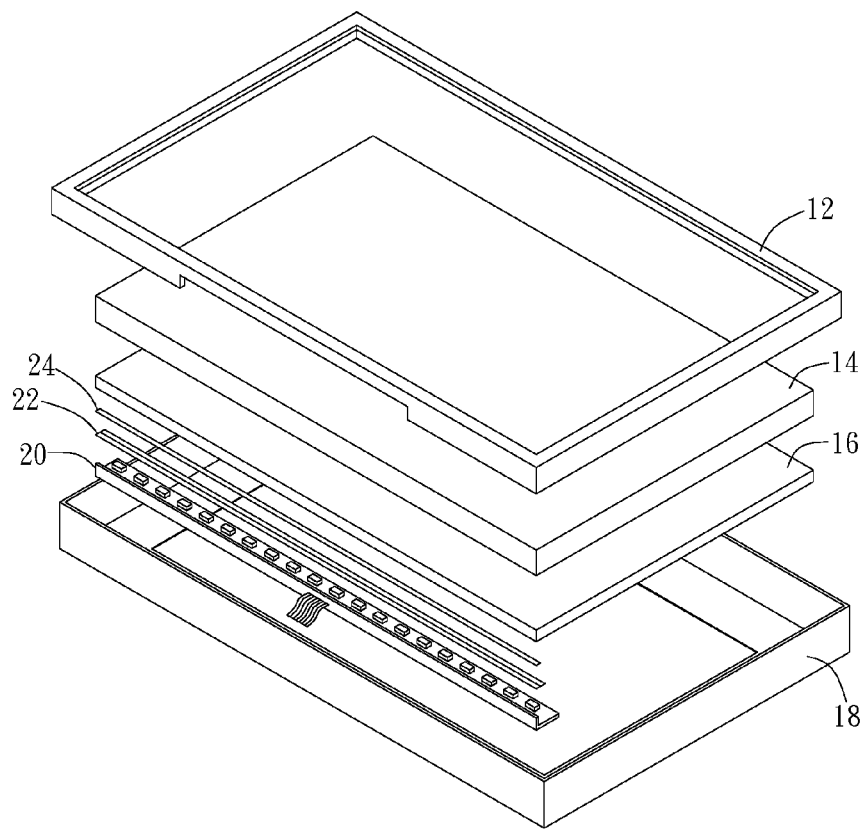
FIG. 1A is an exploded view of a conventional display device.
Figure 1B:
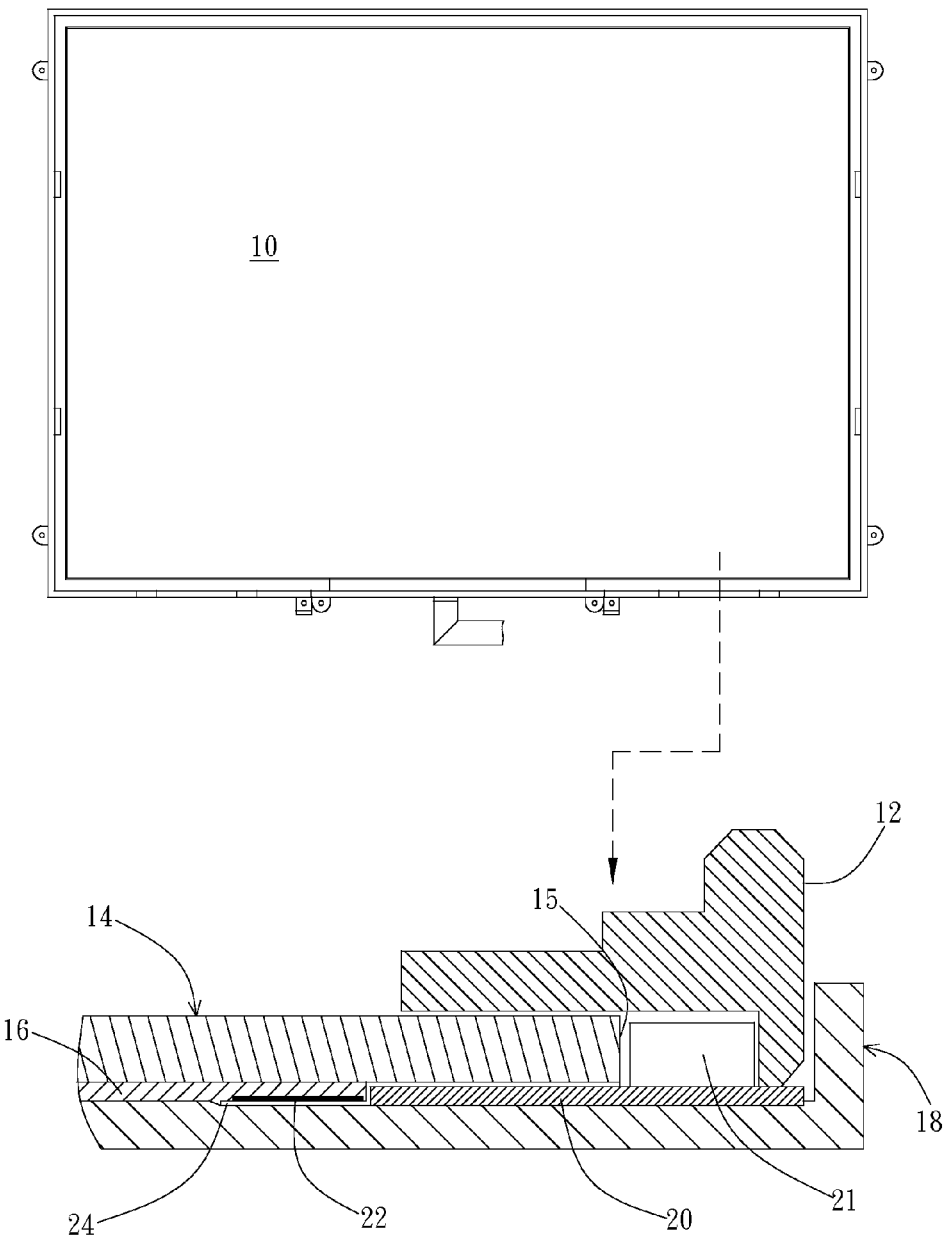
FIG. 1B is a cross-sectional view of the conventional display device.
Figure 2A:
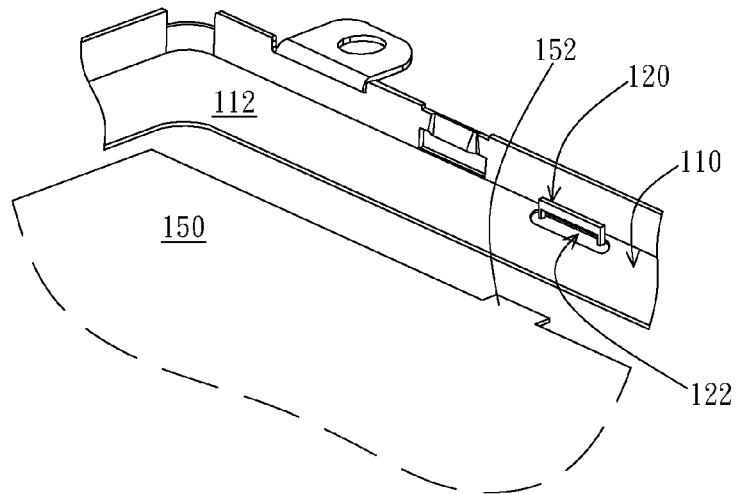
FIG. 2A is a three-dimensional view of the backlight module of the present invention, wherein an optical sheet is disposed in a back plate.
Figure 2B:
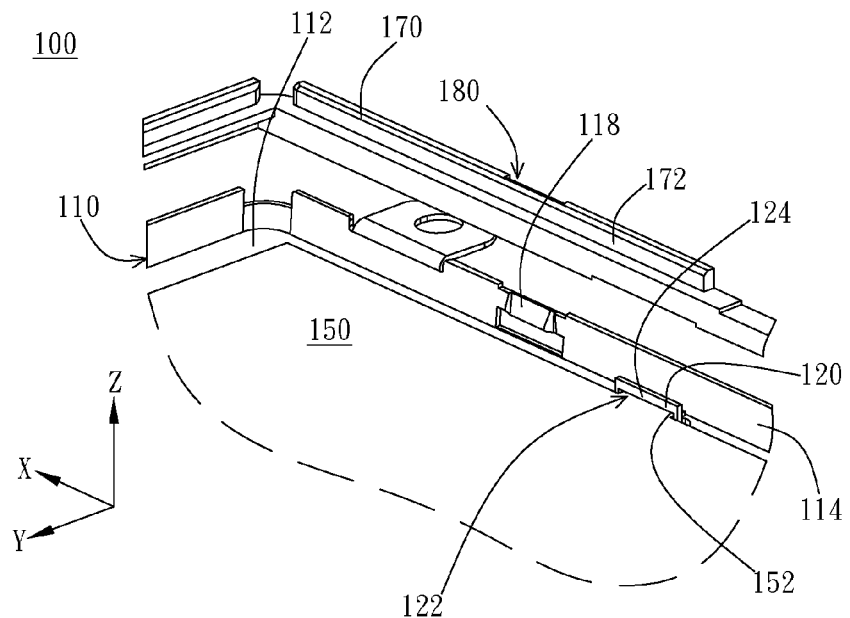
FIG. 2B is a schematic view of an embodiment of the backlight module of the present invention, wherein the optical sheet is positioned on the back plate and assembled to a lateral frame.

As FIG. 2A shows, the backlight module 100 of the present invention includes a back plate 110, an optical sheet 150 and a lateral frame 170 (see FIG. 2B). The back plate 110 has a first surface 112, wherein the first surface includes a raised portion 120 formed near an edge of the first surface. The raised portion 120 of the present embodiment is formed by a raised or bent portion of the back plate 110. In this way, the raised portion 120 is integrally formed with the back plate 110 and becomes a part of the back plate 110. However, in different embodiments, the raised portion 20 can be attached onto the back plate 110 by screws or other methods. As FIG. 2A shows, the raised portion 120 is preferably an arch, wherein an insertion opening is formed between the raised portion and the first surface 112. The optical sheet 150 is disposed on the first surface 112, wherein the optical sheet 150 includes a protrusion 152 formed at one end of the optical sheet 150. The protrusion 152 is inserted into the insertion opening 122 to restrict the displacement of the optical sheet 150.

Figure 3A:
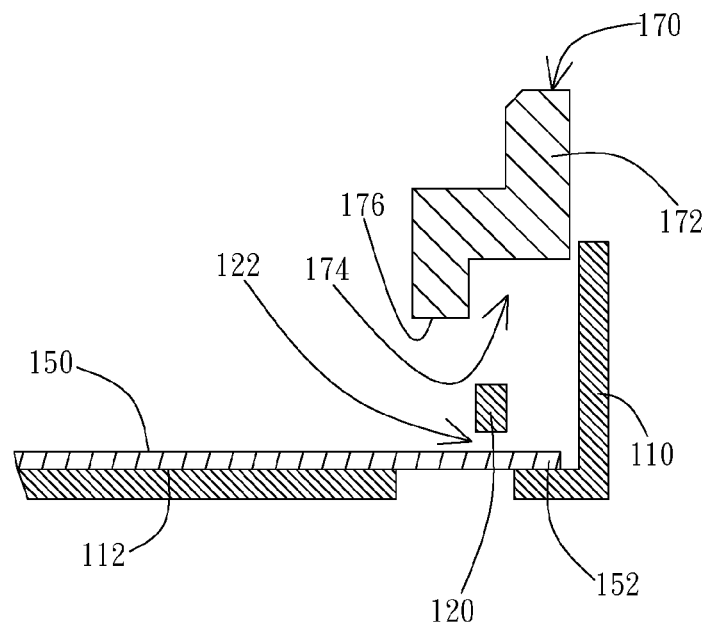
FIG. 3A is a cross-sectional view of the lateral frame positioning the optical sheet.

As FIG. 2B shows, the lateral frame 170 is disposed on the back plate 110 corresponding to the edge of the first surface 112. The lateral frame 170 includes at least one side wall 172, wherein the side wall 172 has a sinking portion 174 (see FIG. 3A) formed at a bottom of the side wall 172 and parallel to the raised portion 120. The raised portion 120 is received in the sinking portion 174 while the bottom of the side wall is placed on the optical sheet 150. In the embodiment illustrated in FIG. 3A, the lateral frame 170 includes a first pressing end 176 formed at one side of the sinking portion 174. When the lateral frame 170 is assembled with on the back plate 110, the first pressing end 176 will press on the first surface 112 to position the optical sheet 150. In other words, the sinking portion 174 is a hollowed-out slot at the bottom of the lateral frame 170, wherein three ends of the slot forms three pressing ends including the first pressing end 176.

Figure 3B:
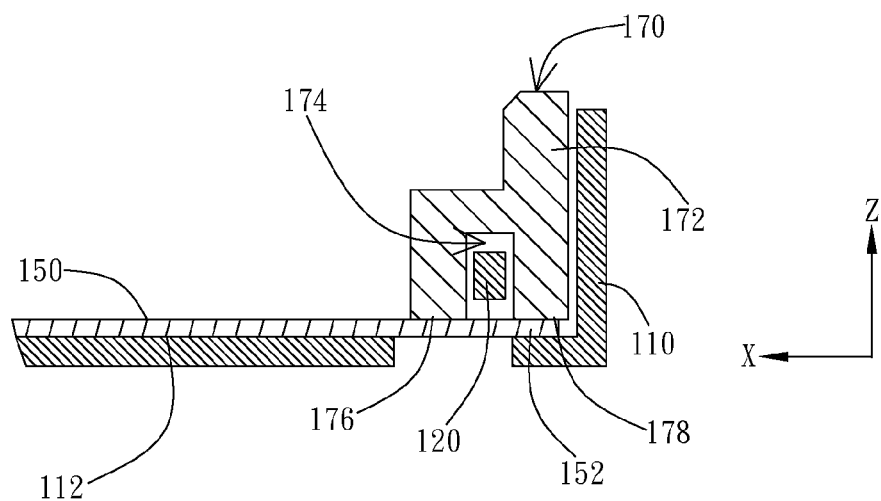
FIG. 3B is a cross-sectional view of another embodiment illustrating the lateral frame positioning the optical sheet.

In another embodiment illustrated in FIG. 3B, two opposite sides of the sinking portion 174 form a first pressing end 176 and a second pressing end 178 for pressing the optical sheet 150. In others words, the sinking portion 174 is a rectangular slot at the bottom of the lateral frame 170, wherein four sides of the sinking portions 174 are all pressing ends. In the present embodiment, the optical sheet 150 is positioned by the lateral frame 170 to limit the displacement of the optical sheet 150 along the Z axis. The raised portion 120 is extending along the X axis direction and will limit the displacement of the optical sheet 150 along X axis. In addition, the protrusion 152 of the optical sheet 150 passing through the insertion opening 122 of the raised portion 120 will limit the displacement of the optical sheet 150 along the Y axis. The dimension of the insertion opening 122 of the raised portion 120 limits the displacement of the protrusion 152 of the optical sheet along the Z axis to better position the optical sheet 150 on the first surface 112 of the back plate 110. The raised portion 120 is received in the sinking portion 174 of the lateral frame 170 and therefore this design will increase the overall structural strength of the lateral frame 170. When the lateral frame 170 deforms due to external force, the raised portion 120 will provide extra support to prevent the lateral frame 170 from further deforming completely.

Figure 5:
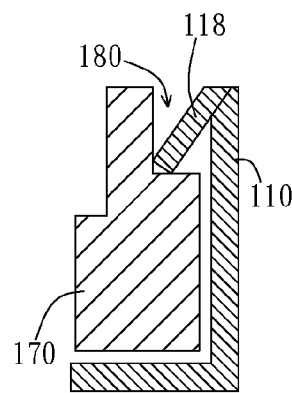
FIG. 5 is a side view of the lateral frame assembled with the back plate.

In the embodiment illustrated in FIG. 2B, an end of the back plate 110 extends perpendicularly to form a side plate 114 including a hook, wherein the side wall of the lateral frame 170 includes a receiving portion 180 for engaging with the hook 118. With reference to FIG. 5, the hook 118 is preferably a buckle structure protruding inward, wherein the receiving portion 180 is a corresponding slot to be buckled up with the hook 118. However, in different embodiments, the hook 118 and the receiving portion 180 can switch positions.

Figure 4A:
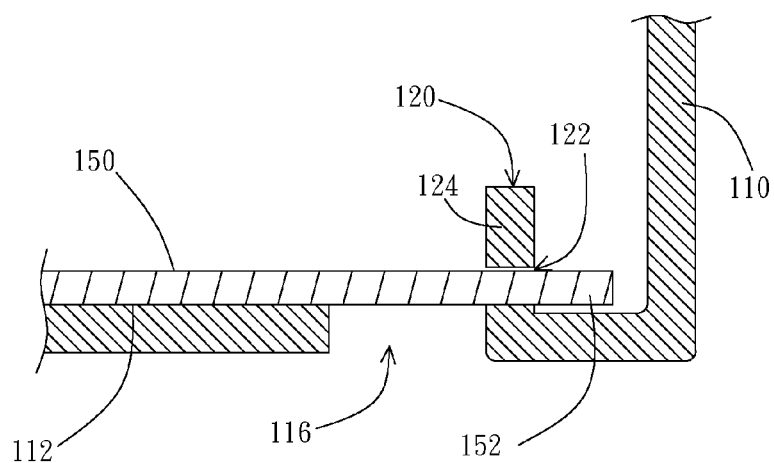
FIG. 4A is a cross-sectional view illustrating a raised portion positioning the optical sheet.
Figure 4B:
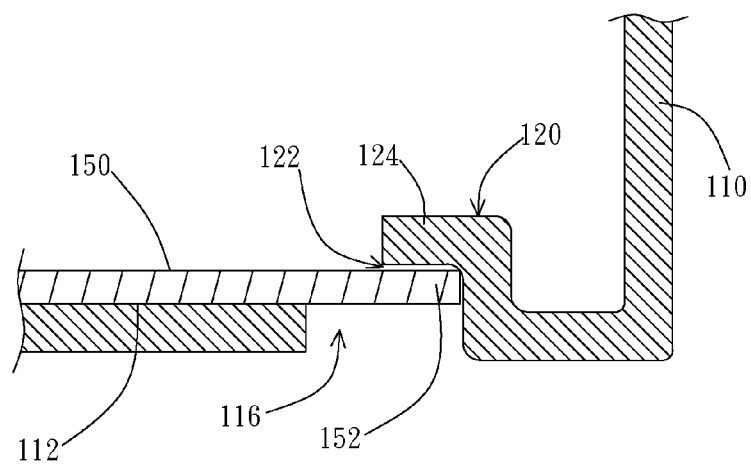
FIG. 4B is a cross-sectional view of another embodiment illustrating the raised portion positioning the optical sheet.
Figure 4C:
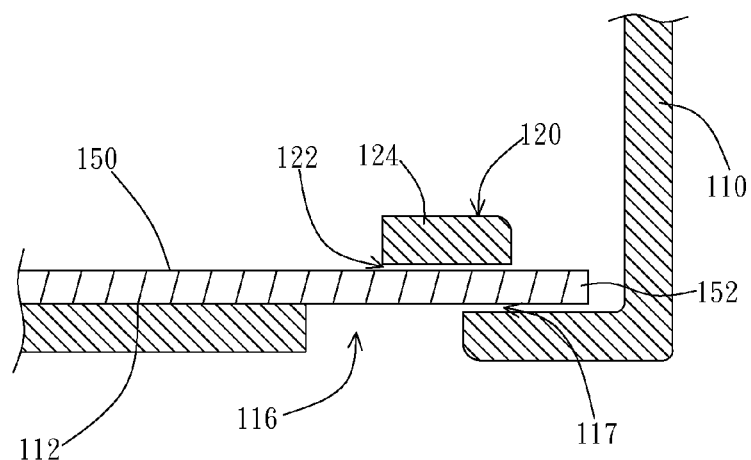
FIG. 4C is a cross-sectional view of yet another embodiment illustrating the raised portion positioning the optical sheet.

As FIG. 4A shows, the raised portion 120 is bent upward from the first surface 112 to form a straight wall 124 perpendicular to an extending direction of the protrusion 152. The insertion opening 122 is preferably formed on the straight wall 124, wherein the protrusion 152 of the optical sheet 150 passes through the insertion opening 122 and extends close to the edge of the first surface 112. In the embodiment illustrated in FIG. 4A, the straight wall 124 is preferably formed by first forming an aperture 116 on the first surface 112 close to the edge of the back plate 110 through stamping or forging and then bending the straight wall 124 upward. However, in the embodiment illustrated in FIG. 4B, the straight wall 124 can be formed by first bending the straight wall 124 upward from the aperture 116 and then bending the straight wall 124 again toward the optical sheet 150. The insertion opening 122 of the straight wall 124 is formed by bending the raised portion 120 toward the optical sheet 150. In the present embodiment, the edge of the optical sheet 150 can be inserted into the insertion opening 122 without forming protrusions 152 on the optical sheet 150. However, in the embodiment illustrated in FIG. 4C, a through hole 117 is formed on the straight wall 124 for the protrusion 152 of the optical sheet 150 to pass therethrough and position the optical sheet 150.

Figure 6A:
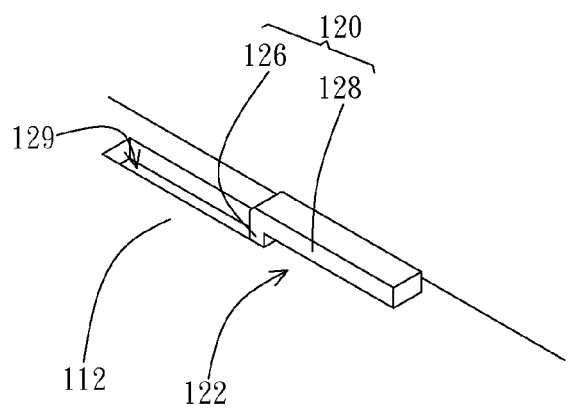
FIG. 6A is a schematic view illustrating a raised portion formed from the back plate.
Figure 6B:
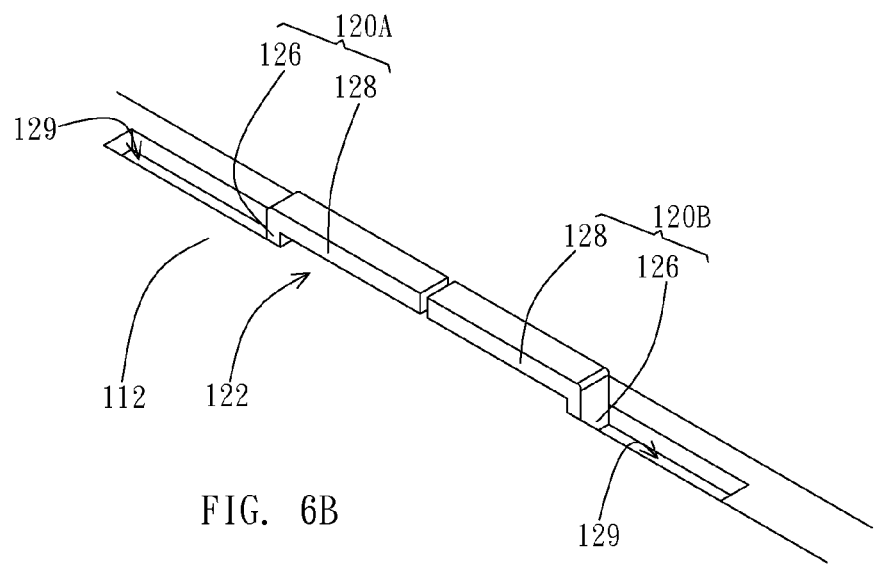
FIG. 6B is another schematic view illustrating the raised portion formed from the back plate.

As FIG. 6A shows, a side opening 129 is formed on the first surface 112 through stamping or forging. After the side opening 129 is formed, the rod-shaped raised portion 120 is bent upward to have a leg portion 126 and an arm 128. In the embodiment illustrated in FIG. 6A, two ends of the leg portion 126 are connected to the first surface 112 and the arm 128, respectively, wherein the arm 128 is perpendicular to the leg portion 126 and parallel to the edge of the first surface 112. The insertion opening 122 is formed between the arm 128 and the first surface 112. In the embodiment illustrated in FIG. 6B, two side openings 129 can be formed at the edge of the back plate 110, wherein a first raised portion 120A and a second raised portion 120B can be formed by bending the rod-shaped raised portion 120 from the two side openings 129 upward. The first raised portion 120A and the raised portion 120B each has a leg portion 126 and an arm 128, wherein each leg portion 126 is connected to the first surface 112 and the respective arm 128 while the arms 128 are parallel to the first surface 112. The insertion opening 122 is formed between the arm 128 and the first surface 112. The size of the raised portion 120, 120A and 120B can be adjusted according to the size of the optical sheet 150 or other design choices.

Figure 7:
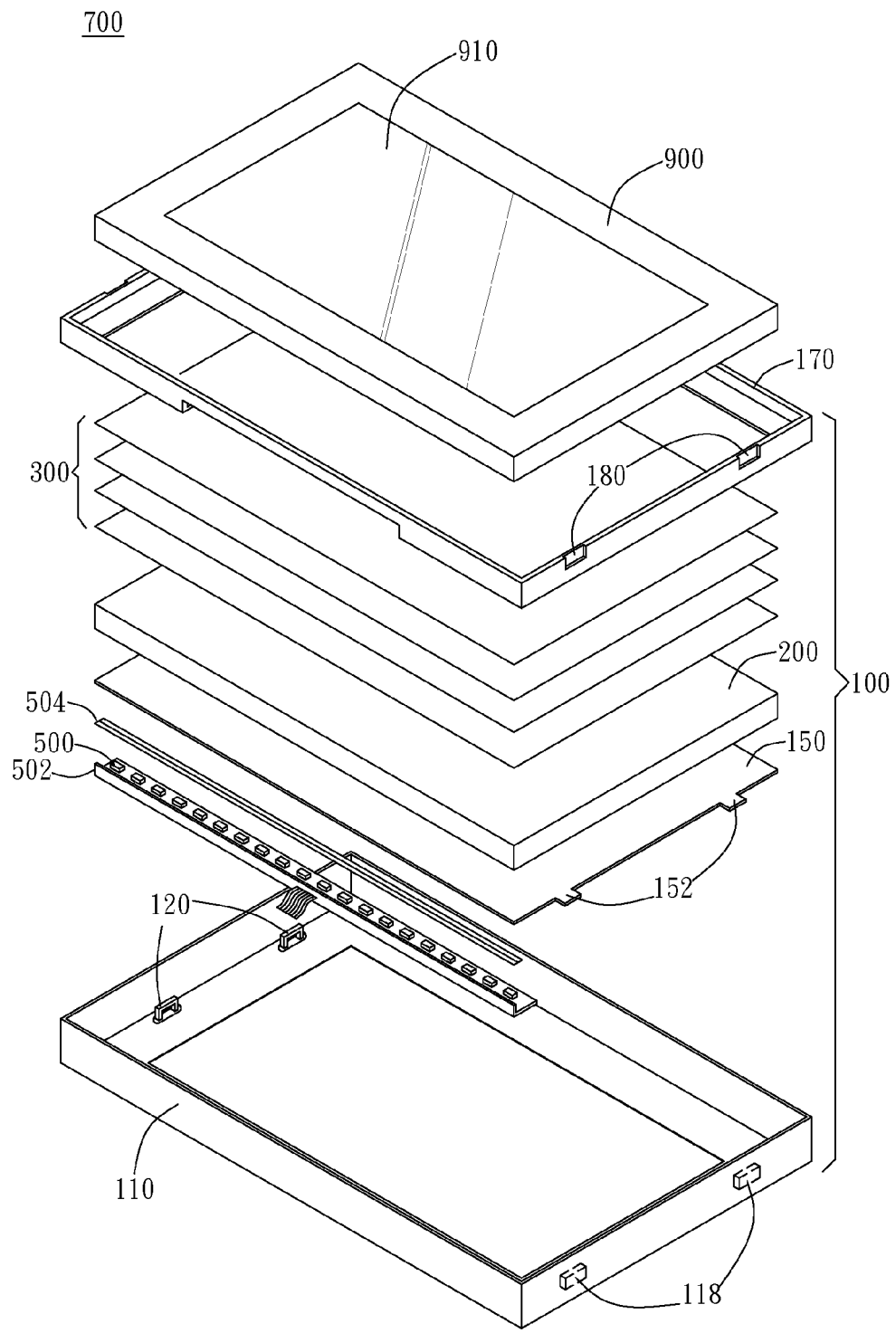
FIG. 7 is an exploded view of the display device of the present invention.
Figure 8:
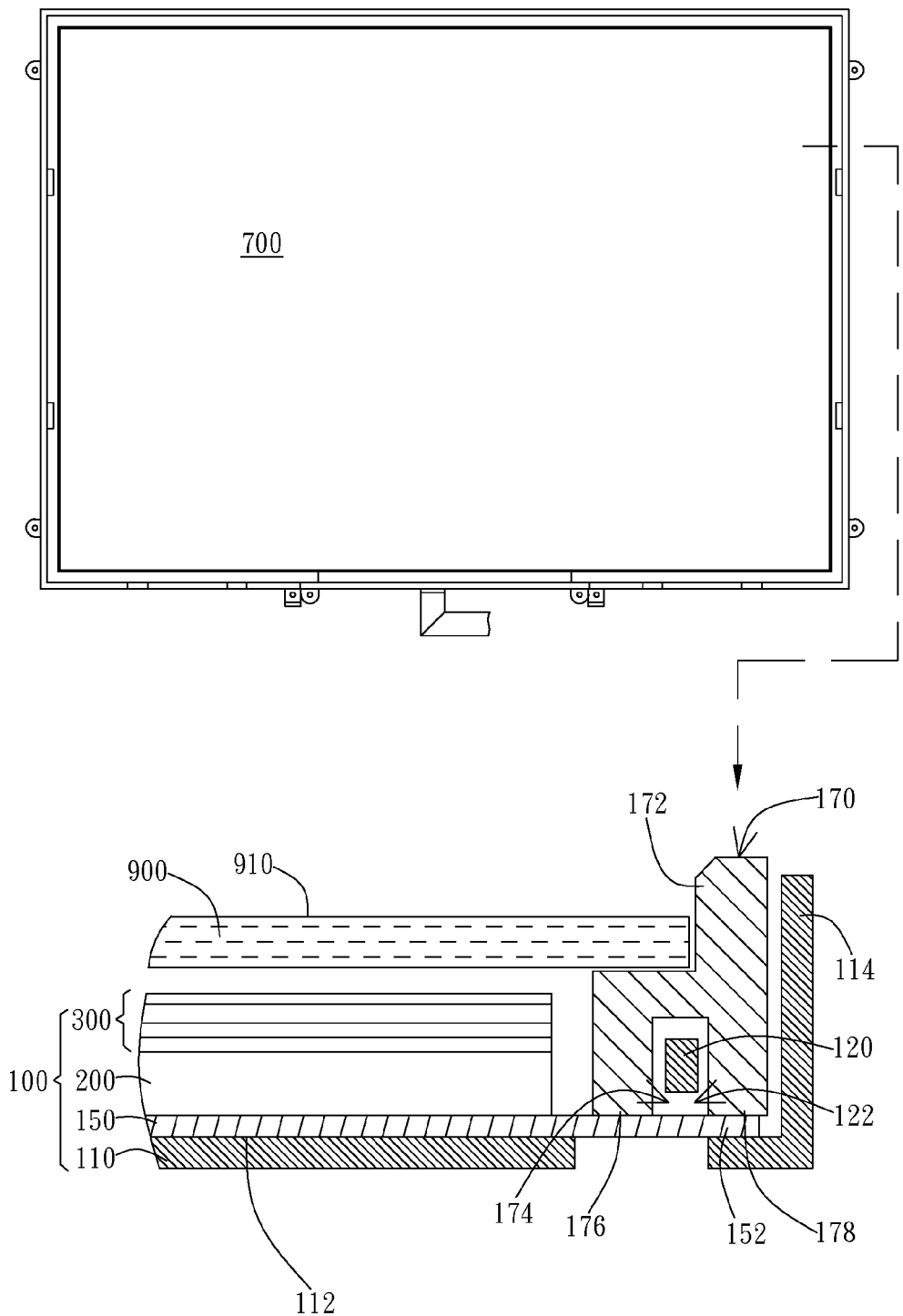
FIG. 8 is a cross-sectional view of the display device of the present invention.

As FIG. 7 and FIG. 8 show, the present invention also provides a display device 700 mainly composed of the above-mentioned backlight module 100 and a liquid crystal display panel 900. The liquid crystal display panel 900 has an active area 910, wherein the liquid crystal display panel 900 is disposed above the backlight module 100 to receive light provided by the backlight module 100 and then generates images or the active area 910.

In the embodiment illustrated in FIG. 7 and FIG. 8, the light source of the backlight module 100 is preferably an edge-light type and a light emitting diode bar 500 (LED bar) including a plurality of light emitting diodes 502 disposed on one side of the back plate 110. However, in different embodiments, the light source can be a direct-light type and includes conventional lamps such as cold cathode fluorescent lamps. Adhesive tape 504 is attached to one side of the LED bar 500 while another side of the LED bar 500 is fixed on the back plate 110. After the LED bar 500 is fixed on the back plate 110, the optical sheet 150, the light guide plate 200, a plurality of optical films 300 and the lateral frame 170 are disposed orderly on top of the LED bar 500. The protrusion 152 of the optical sheet 150 is preferably inserted into the insertion opening 122 of the raised portion 120 to position the optical sheet 150. In the embodiment illustrated in FIG. 8, the raised portion 120 extends into the sinking portion 174, wherein the first pressing end 176 and the second pressing end 178 at two sides of the sinking portion 174 will limit the displacement of the optical sheet 150 in Z-axis direction. Please refer to previous embodiments for the structure and means for forming the raised portion 120. Furthermore, quantity, shape and location of the raised portion 120 can be adjusted according to the size of the optical sheet 150 or other design choices.

When the optical sheet 150 is properly positioned, the light guide plate 200, the optical films 300 and the rectangular lateral frame 170 are orderly disposed on top of the optical sheet 150, wherein a portion of the back plate 110 extends upward to form a side plate 114 having hooks 118. A receiving portion 180 is formed on the outer surface of the lateral frame 170 for coupling with the hook 118 to position the light guide plate 200, optical films 300 and the LED bar 500 between the lateral frame 170 and the back plate 110. Finally, the liquid crystal display panel 900 having an active area 910 is disposed on the backlight module 100 to form the display device 700.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:
1. A backlight module, comprising:
   a back plate having a first surface, wherein the first surface includes a raised portion formed near an edge of the first surface, an insertion opening is formed between the raised portion and the first surface;
   an optical sheet disposed on the first surface, wherein the optical sheet includes a protrusion formed at one end of the optical sheet, the protrusion is inserted into the insertion opening; and
   a lateral frame separably disposed on the back plate corresponding to the edge of the first surface, the lateral frame including at least a side wall having a sinking portion formed at a bottom of the side wall, wherein the bottom of the side wall is disposed on the optical sheet while the raised portion is received in the sinking portion.

2. The backlight module of claim 1, wherein the raised portion is bent upward from the first surface to form a straight wall perpendicular to an extending direction of the protrusion.

3. The backlight module of claim 2, wherein the insertion opening is formed on the straight wall, the protrusion passes through the insertion opening close to the edge of the first surface.

4. The backlight module of claim 2, wherein the insertion opening is formed by bending the raised portion toward the optical sheet.

5. The backlight module of claim 1, wherein the raised portion has a leg portion and an arm, the leg portion is connected to the first surface and the arm while the arm is perpendicular to the leg portion and parallel to the edge of the first surface.

6. The backlight module of claim 1, wherein the raised portion includes a first raised portion and a second raised portion, each of the first raised portion and the second raised portion has a leg portion and an arm, the leg portion is connected to the first surface and the arm while the arm is parallel to the first surface.

7. The backlight module of claim 1, wherein the lateral frame further includes a first pressing end formed at one side of the sinking portion for positioning the optical sheet on the first surface.

8. The backlight module of claim 1, wherein the lateral frame further includes a first pressing end and a second pressing end formed on two opposite sides of the sinking portion for positioning the optical sheet on the first surface.

9. The backlight module of claim 1, wherein one end of the back plate extends in a direction perpendicular to the back plate to form a side plate including a hook, the side wall of the lateral frame includes a receiving portion for engaging with the hook.

10. A display device, comprising:
   a liquid crystal display panel having a display surface; and
   a backlight module disposed below the liquid crystal display panel, the backlight module including a back plate having a first surface, wherein the first surface includes a raised portion formed near an edge of the first surface, an insertion opening is formed between the raised portion and the first surface;
   an optical sheet disposed on the first surface, wherein the optical sheet includes a protrusion formed at one end of the optical sheet, the protrusion is inserted into the insertion opening; and
   a lateral frame separably disposed on the back plate corresponding to the edge of the first surface, the lateral frame including a side wall having a sinking portion formed at a bottom of the side wall, wherein the bottom of the side wall is disposed on the optical sheet while the raised portion is received in the sinking portion.

11. The display device of claim 10, wherein the raised portion is bent upward from the first surface to form a straight wall perpendicular to an extending direction of the protrusion.

12. The display device of claim 11, wherein the insertion opening is formed on the straight wall, the protrusion passes through the insertion opening close to the edge of the first surface.

13. The display device of claim 11, wherein the insertion opening is formed by bending the raised portion toward the optical sheet.

14. The display device of claim 10, wherein the raised portion has a leg portion and an arm, the leg portion is connected to the first surface and the arm while the arm is perpendicular to the leg portion and parallel to the edge of the first surface.

15. The display device of claim 10, wherein the raised portion includes a first raised portion and a second raised portion, each of the first raised portion and the second raised portion has a leg portion and an arm, the leg portion is connected to the first surface and the arm while the arm is parallel to the first surface.

16. The display device of claim 10, wherein the lateral frame further includes a first pressing end formed at one side of the sinking portion for positioning the optical sheet on the first surface.

17. The display device of claim 10, wherein the lateral frame further includes a first pressing end and a second pressing end formed on two opposite sides of the sinking portion for positioning the optical sheet on the first surface.

18. The display device of claim 10, wherein one end of the back plate extends in a direction perpendicular to the back plate to form a side plate including a hook, the side wall of the lateral frame includes a receiving portion for engaging with the hook.

* * * * *